US011263402B2

(12) United States Patent
Tan et al.

(10) Patent No.: US 11,263,402 B2
(45) Date of Patent: Mar. 1, 2022

(54) FACILITATING DETECTION OF CONVERSATION THREADS IN A MESSAGING CHANNEL

(71) Applicant: International Business Machines Corporation, Armonk, NY (US)

(72) Inventors: Ming Tan, Malden, MA (US); Dakuo Wang, Cambridge, MA (US); Mo Yu, White Plains, NY (US); Chuang Gan, Cambridge, MA (US); Haoyu Wang, Somerville, MA (US); Shiyu Chang, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 196 days.

(21) Appl. No.: 16/404,156

(22) Filed: May 6, 2019

(65) Prior Publication Data

US 2020/0356629 A1    Nov. 12, 2020

(51) Int. Cl.
*G06F 40/30* (2020.01)
*G06F 40/205* (2020.01)
*G06F 40/289* (2020.01)

(52) U.S. Cl.
CPC ............ *G06F 40/30* (2020.01); *G06F 40/205* (2020.01); *G06F 40/289* (2020.01)

(58) Field of Classification Search
CPC ...... G06F 40/30; G06F 40/205; G06F 40/289; G06F 40/35
See application file for complete search history.

(56) References Cited

U.S. PATENT DOCUMENTS

| 7,693,940 B2 | 4/2010 | Carmel et al. |
| 8,693,643 B2 | 4/2014 | Mikan et al. |
| 8,978,039 B2 | 3/2015 | Sutedja et al. |
| 9,928,383 B2 | 3/2018 | York et al. |

(Continued)

OTHER PUBLICATIONS

Mehri et al., Chat Disentanglement: Identifying Semantic Reply Relationships with Random Forests and Recurrent Neural Networks, Dec. 1, 2017, Proceedings of the The 8th International Joint Conference on Natural Language Processing, pp. 615-623 (Year: 2017).*

(Continued)

*Primary Examiner* — Edgar X Guerra-Erazo
*Assistant Examiner* — Athar N Pasha
(74) *Attorney, Agent, or Firm* — Amin, Turocy & Watson, LLP

(57) ABSTRACT

Techniques facilitating detection of conversation threads in unstructured channels are provided. A system can comprise a memory that stores computer executable components and a processor that executes the computer executable components stored in the memory. The computer executable components can comprise an extraction component that employs a model to detect conversation messages based on a defined confidence level and assigns the conversation messages to respective conversation thread categories. The computer executable components also can comprise a model component that trains the model on conversation messages that comprise respective text data, wherein the model is trained to detect the respective text data to the defined confidence level.

20 Claims, 13 Drawing Sheets

(56) References Cited

U.S. PATENT DOCUMENTS 10,083,321 B2    9/2018   York et al.
2021/0359874 A1* 11/2021  Zhuk .................... G06N 3/0454

OTHER PUBLICATIONS

Jiang et al., Learning to Disentangle Interleaved Conversational Threads with a Siamese Hierarchical Network and Similarity Ranking, Jun. 1-6, 2018, Proceedings of NAACL-HLT 2018, pp. 1812-1822 New Orleans, Louisiana, Association for Computational Linguistics (Year: 2018).*

Belkaroui et al., "Conversation Analysis on Social Networking Sites", The 10th International Conference on Signal-Image Technology and Internet-Based Systems (SITIS), Nov. 2014, pp. 172-178, 8 pages.

Zerfos et al., "A Study of the Short Message Service of a Nationwide Cellular Network", IMC'06, Oct. 25-27, 2006, 6 pages.

Smyth et al., "Threaded IM", IP.com, IPCOM000224899D, Jan. 10, 2013, 4 pages.

Anonymous, "Linking between email messages in a threaded conversation by using combination of sender name and timestamp", IP.com, IPCOM000240065D, Dec. 29, 2014, 2 pages.

Anonymous, "Method to correlate messages in multi-threaded conversation", IP.com, IPCOM000254365D, Jun. 22, 2018, 6 pages.

Goenka et al., "Method and System for Merging Multiple Threads of Messages that are Alike", IP.com, IPCOM000257262D, Jan. 28, 2019, 3 pages.

Devlin et al., "BERT: Pre-training of Deep Bidirectional Transformers for Language Understanding", arXiv:1810.04805v1 [cs.CL], Oct. 11, 2018, 14 pages.

Peters et al., "Deep contextualized word representations", arXiv:1802.05365v2 [cs.CL], Mar. 22, 2018, 15 pages.

Cer et al., "Universal Sentence Encoder", arXiv:1803.11175v2 [cs.CL], Apr. 12, 2018, 7 pages.

Repke et al., "Bringing Back Structure to Free Text Email Conversations with Recurrent Neural Networks", in European Conference on Information Retrieval, LNCS, vol. 10772, Mar. 2018, pp. 114-126, 13 pages.

Nguyen et al., "Thread Reconstruction in Conversational Data using Neural Coherence Models", arXiv:1707.07660v2 [cs.IR], Jul. 25, 2017, 5 pages.

Adams et al., "Topic Detection and Extraction in Chat", IEEE International Conference on Semantic Computing, 2008, pp. 581-588, 8 pages.

Mayfield et al., "Hierarchical Conversation Structure Prediction in Multi-Party Chat", Proceedings of the 13th Annual Meeting of the Special Interest Group on Discourse and Dialogue (SIGDIAL), Jul. 5-6, 2012, pp. 60-69, 10 pages.

Shen et al., "Thread Detection in Dynamic Text Message Streams", Proceedings of the 29th annual international ACM SIGIR conference on Research and development in information retrieval, Aug. 6-11, 2006, pp. 35-42, 8 pages.

Mell et al., "The NIST Definition of Cloud Computing", National Institute of Standards and Technology, Special Publication 800-145, Sep. 2011, 7 pages.

\* cited by examiner

FACILITATING DETECTION OF CONVERSATION THREADS IN A MESSAGING CHANNEL

BACKGROUND

This disclosure relates to messaging channels and, more specifically, to detecting conversation threads in unstructured channels.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments, systems, computer-implemented methods, apparatuses, and/or computer program products that facilitate detection of conversation threads in a messaging channel are provided.

According to an embodiment, a system can comprise a memory and a processor. The memory can store computer executable components and the processor can execute the computer executable components stored in the memory. The computer executable components can comprise an extraction component that employs a model to detect conversation messages based on a defined confidence level and assigns the conversation messages to respective conversation thread categories.

According to another embodiment, a computer-implemented method can comprise detecting, by a system operatively coupled to a processor, conversation messages based on a model trained to a defined confidence level. The computer-implemented method also can comprise assigning, by the system, the conversation messages to respective conversation thread categories.

According to a further embodiment, a computer program product that facilitates detection of conversation threads in a messaging channel is provided herein. The computer program product can comprise a computer readable storage medium having program instructions embodied therewith, the program instructions are executable by a processor to cause the processor to detect conversation messages based on a model trained to a defined confidence level. The program instructions also can cause the processor to assign the conversation messages to respective conversation thread categories.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As discussed herein, provided is detection of multiple threads in a mixed conversation channel. According to one or more embodiments, a synthetic dataset can be constructed as preparation for training a machine learning model as discussed herein. For example, the synthetic data can be constructed with a large number of questions, answers, and comments (e.g., 15 million questions, 24 million answers, and 64 million comments). However, the disclosed aspects are not limited to these example numbers and other quantities can be utilized to train the model. Further, in some embodiments, the answer messages and comment messages can be labeled under the same question message as the same thread of conversation and can be given a unique CID (conversation ID). A data construction algorithm can be utilized to generate synthetic mixed multi-thread conversation datasets to represent the public message channels. Further, in some embodiments, one or more pre-trained models can be utilized to perform fine tuning on the synthetic dataset. Further, messages belonging to hundreds of conversation threads in one public group messaging channel can be labeled and verified to evaluate the trained model.

Figure 1:
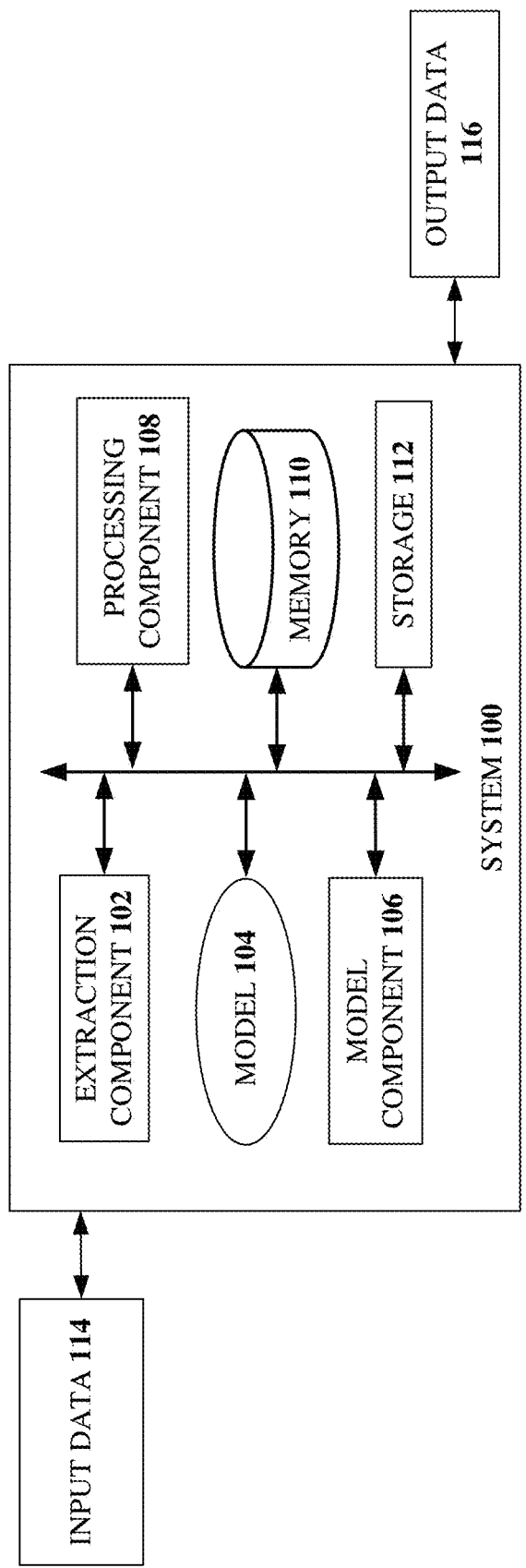
FIG. 1 illustrates a block diagram of an example, non-limiting, system that facilitates detection of conversation threads in a messaging channel in accordance with one or more embodiments described herein.

FIG. 1 illustrates a block diagram of an example, non-limiting, system 100 that facilitates detection of conversation threads in a messaging channel in accordance with one or more embodiments described herein. Aspects of systems (e.g., the system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

In various embodiments, the system 100 can be a computing system associated with technologies such as, but not limited to, circuit technologies, processor technologies, computing technologies, artificial intelligence technologies, medicine and materials technologies, supply chain and logistics technologies, financial services technologies, and/or other digital technologies. The system 100 can employ hardware and/or software to solve problems that are highly technical in nature (e.g., receive unstructured input data from a multitude of sources (e.g., a multitude of different devices) in disperse locations, receive the unstructured input data where input data of the unstructured input data can be related to one or more different topics (e.g., a first subset of input data is related to a first topic or context, a second subset of input data is related to a second topic or context, and so on), analyze information contained in the unstructured input data, categorize related input data, output structured data derived from the unstructured input data, and so forth), that are not abstract and that cannot be performed as a set of mental acts by a human. Further, in certain embodiments, some of the processes performed can be performed by one or more specialized computers (e.g., one or more specialized processing units, a specialized computer with an extraction component, a model component, and so on) to carry out defined tasks related to machine learning for facilitating detection of conversation threads in one or more messaging channels.

The system 100 and/or components of the system 100 can be employed to solve new problems that arise through advancements in technologies mentioned above, computer architecture, and/or the like. The system 100 (and other embodiments discussed herein can detect multiple threads in a conversation channel comprising multiple parties, which can include a large-scale synthetic dataset construction step, as well as a model building and testing step. The construction, building, and tested can be facilitated with the assistance of a pretrained model, according to some implementations.

One or more embodiments of the system 100 can provide technical improvements to computing systems, circuit systems, processor systems, artificial intelligence systems, and/or other systems. One or more embodiments of the system 100 can also provide technical improvements to a processor by improving processing performance of the processor, improving processing efficiency of the processor and/or improving processing characteristics of the processor.

In the embodiment shown in FIG. 1, the system 100 can comprise an extraction component 102, a model 104, a model component 106, a processing component 108, a memory 110, and/or a storage 112. The memory 110 can store computer executable components and instructions. The processing component 108 (e.g., a processor) can facilitate execution of the instructions (e.g., computer executable components and corresponding instructions) by the extraction component 102, the model component 106, and/or other system components. As shown, in some embodiments, one or more of the extraction component 102, the model 104, the model component 106, the processing component 108, the memory 110, and/or the storage 112 can be electrically, communicatively, and/or operatively coupled to one another to perform one or more functions of the system 100.

The extraction component 102 can receive, as input data 114, one or more conversation messages. The input data 114 can be received from an arbitrary number of users (e.g., through their respective communication devices) chatting or communicating in the same channel).

For example, the conversation messages can be machine-readable descriptions received from an instant messaging system or another system that can support group tasks. The instant messaging system (or other system) can facilitate communication between a multitude of entities (e.g., through respective communication devices) at substantially the same time. Further, the multitude of entities, or at least a subset thereof, can be on a same channel.

For example, a channel could be dedicated for a department in a corporation, which could comprise a large amount of entities and associated communication devices. In a specific example, a development department of an automobile manufacturer could have thousands of people and there could be multiple products being designed in parallel. Thus, in an attempt to facilitate the communication within the department, each product could have its own channel. Further, there could be hundreds of different channels, not just based on the quantity of products being developed, but also on the amount of time each person has been employed by the corporations. Some channels could be considered stale (or have died), however, a substantial number of channels could be still alive and a new person (to the corporation, department, and/or product line) does not have time to read all the communications and there is no way to organize the data within each channel.

For example, when messages are posted in channels (e.g., public channels, private channels, messages from various friends mixed together in one user's timeline), the message are free-form messages (or unstructured messages). Further, when posting messages, consideration is not given as to how to organize the messages for future retrieval. For example, when I post a message today, I do not consider that someone will read that message at a later time (e.g., a few days, weeks, months, and/or years later). However, as mentioned above, sometimes new members join the group (e.g., the product line in the above example) after some time and it can be hard for that member to navigate through all those messages to discover the knowledge (e.g., organization wisdom or institutional memory) that is contained in the messages.

The disclosed aspects can use a model (or more than one model) to automatically (e.g., dynamically) perform the organization and mapping between disjointed and unstructured messages. As mentioned above, the input data 114 can comprise one or more conversation messages that can be machine-readable descriptions of text communications (e.g., messages) between one or more entities (e.g., through respective communication devices).

As discussed herein the input data 114 can be unstructured, thus, there is no link between the messages. In contrast, an email system can comprise structured data. For example, an email can have a structure, which can include a "from" field indicating the originator of the email, a "to" field indicating the one or more recipients of the email, a subject line field, a bridge (e.g., "Hello," "Good Afternoon," and so on) that can indicate the start of a message, a closing greeting (e.g., "Thanks," "Yours Truly," and so on). Optionally, there can also be a signature field and/or other fields. This structure allows for classification or grouping of related messages. However, the disclosed aspects are related to unstructured input data that comprises free-form tasks that have no definite thread-information for each of the messages, thus, the disclosed aspects relate to an unsupervised machine learning task.

The model 104 can be a pre-trained pairwise classification model. In an example, the model can be a binary classification model. According to some implementations, the model can be a deep learning model for automatic thread detection for a public channel mixed with multiple threads from a large number of senders and a synthetic dataset can be generated for transfer learning.

Further, the model 104 can be used as the base model, in order to involve more out-of-domain corpus to capture some linguistic information. The pretrained model can include, but is not limited to Bidirectional Encoder Representations from Transformers (BERT), Embeddings from Language Models (ELMO), Universal Sentence Encoder (USE), and so forth. Based, at least in part, on the input data 114 (e.g., the conversation messages), the extraction component 102 can employ the model 104 to detect one or more conversation messages of the conversation messages (e.g., the input data 114) and generate output data 116. For example, the extraction component 102 (and/or the model 104) can detect the one or more conversation messages to a defined confidence level. Further, the extraction component 102 can assign the one or more conversation messages of the conversation messages to respective conversation thread categories. The output data 116 can comprise data that indicated messages that are clustered together (e.g., related to the same content). For example, the model 104 can be utilized to cluster messages into multiple-turns conversation threads and provide such information as the output data 116.

In certain embodiments, the extraction component 102 can perform the detection and assignment, and can generate the output data (e.g., the respective conversation thread categories) based on classifications, correlations, inferences and/or expressions associated with principles of artificial intelligence. For instance, the extraction component 102, as well as other system components, can employ an automatic classification system and/or an automatic classification process to determine which conversations messages received as input data belong together or are related to the same topic and/or context, when to classify a conversation message as belonging to a different topic than a previously received conversation message, and so on. In one example, the extraction component 102 and/or the model component 106 can employ a probabilistic and/or statistical-based analysis (e.g., factoring into the analysis utilities and costs) to learn and/or generate inferences with respect to selection of contexts for one or more conversation messages (or other input data). In an aspect, the extraction component 102 and/or the model component 106 can comprise an inference component (not shown) that can further enhance automated aspects of the extraction component 102 and/or the model component 106 utilizing in part inference-based schemes to facilitate learning and/or generating inferences associated with the selection of one or contexts to which one or more conversation messages (or other input data) should be assigned in order to achieve improved processing performance and to output structured data derived from the received input data (e.g., unstructured input data).

The extraction component 102 can employ any suitable machine-learning based techniques, statistical-based techniques, and/or probabilistic-based techniques. For example, the extraction component 102 can employ expert systems, fuzzy logic, Support Vector Machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the extraction component 102 can perform a set of machine learning computations associated with facilitating detection of conversation threads in a messaging channel, deriving statistics that can be utilized as considerations by the model (e.g., how many threads occur in parallel, what is the average length of a thread, how many turns for each of those conversations, and so on).

For example, the extraction component 102 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to facilitate detection of conversation threads in a messaging channel.

Further, prior to the extraction component 102 employing the model 104, the model component 106 can train the model 104 on the input data 114 (e.g., one or more conversation messages) and/or on other data. The one or more conversation messages can comprise respective text data. For example, a first conversation message can comprise first text data, a second conversation message can comprise second text data, a third conversation message can comprise third text data, and so on. Further, the model component 106 can train the model 104 to detect the respective data to the defined confidence level. In accordance with some implementations, the conversation messages can comprise parallel conversations that occur during an overlapping time period.

According to some implementations, the model component 106 can train the model 104 to identify the text data of the one or more conversation messages received over a defined interval. In some implementations, the model component 106 can train the model 104 on the text data of conversation messages that started during the defined interval. For example, if a conversation message started before the defined interval, that conversation message can be ignored. However, if a conversation message started during the defined interval, the conversation message can be utilized by the model component 106 to train the model 104.

The input data 114 (e.g., the conversation messages) can be received via a public message channel according to some implementations. For example, the public message channel can comprise multiple conversation threads. Further to these implementations, the extraction component 102 can disentangle the conversation messages based on the model 104.

It is to be appreciated that the system 100 (e.g., the extraction component 102, the model component 106, as well as other system components) performs a classification of one or more messages in a channel that comprises unstructured input received from one or more entities, which cannot be performed by a human (e.g., is greater than the capability of a single human mind). For example, an amount of data processed, a speed of data processed, and/or data types of data processed by the system 100 (e.g., the extraction component 102 and/or other system components) over a certain period of time can be greater, faster, and different than an amount, speed, and data type that can be processed by a single human mind over the same period of time. The system 100 can also be fully operational towards performing one or more other functions (e.g., fully powered on, fully executed, etc.) while also performing the above-referenced detection of conversation threads in a messaging channel. Moreover, the output data 116 generated and coordinated by the system 100 (e.g., the extraction component 102, the model component 106, and/or other system components) can include information that is impossible to obtain manually by a user. For example, a type of information included in the input data 114, a variety of information associated with the input data 114, communication with one or more sources providing the input data 114, and/or optimization of the input data utilized to facilitate the detection of conversation threads and output the output data 116 can be more complex than information that can be obtained manually and processed by a user.

Figure 2:
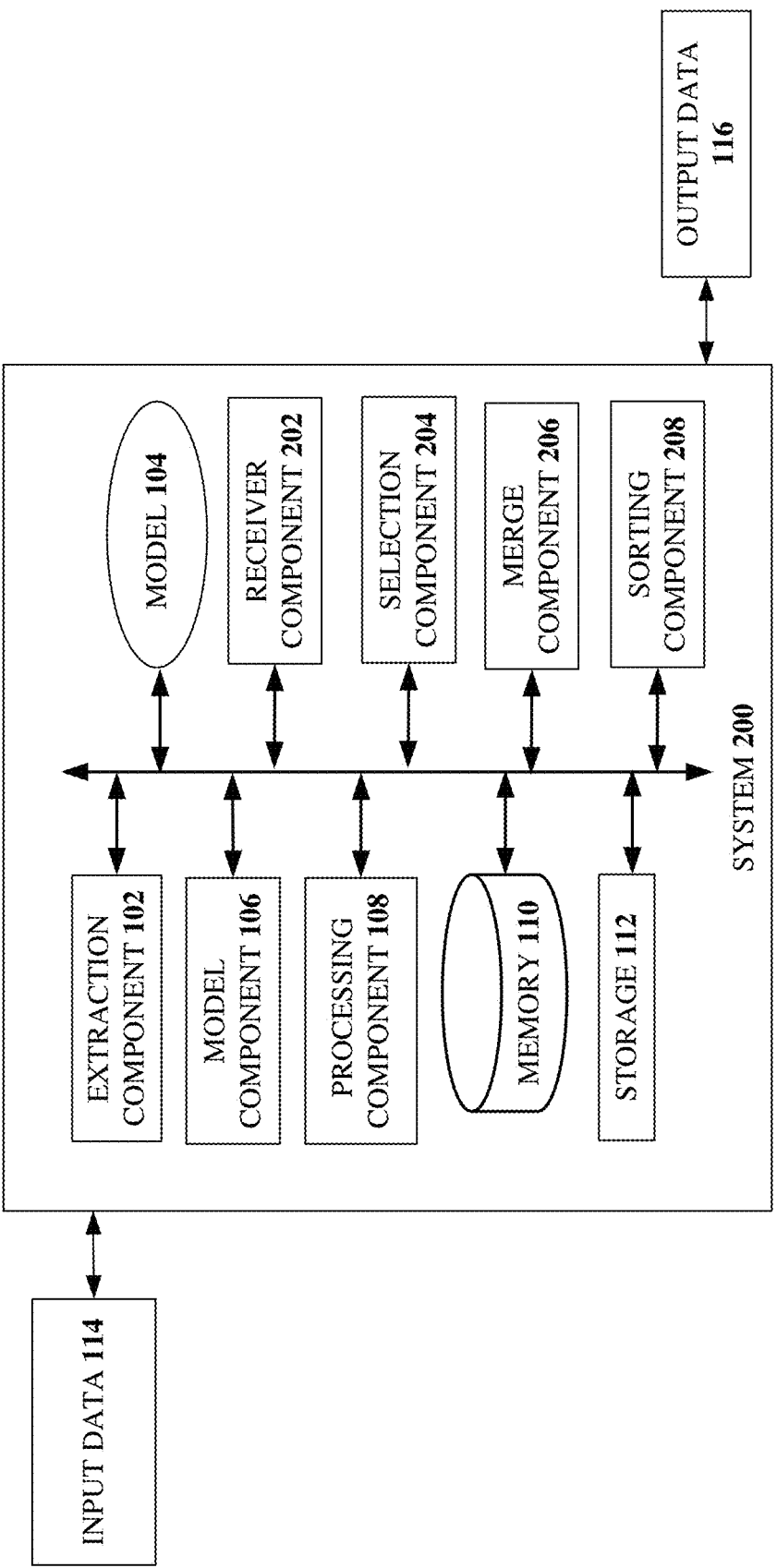
FIG. 2 illustrates a block diagram of an example, non-limiting, system that facilitates training a model to detect text data associated with conversation messages in accordance with one or more embodiments described herein.

FIG. 2 illustrates a block diagram of an example, non-limiting, system 200 that facilitates training a model to detect text data associated with conversation messages in accordance with one or more embodiments described herein. Repetitive description of like elements employed in other embodiments described herein is omitted for sake of brevity. The system 200 can comprise one or more of the components and/or functionality of the system 100, and vice versa.

As discussed herein, a conversation can be a sequence of messages, which can include an original message (e.g., an original post, an original question, and so on), and subsequent or following messages (e.g., response posts, answers, and/or comments, and so forth). The disclosed aspects can facilitate automated conversation thread detection.

One or more conversations created with a defined period of time can be collected by a receiver component 202. The defined period of time can be selected such that an adequate number of conversations are able to be collected. In an example, the defined period of time is thirty days, however, another period of time can be selected based on a design choice. Further, the conversations of the one or more conversations can include messages with content text. The conversations can also include metadata, which can include a unique conversation identifier, the user identifier who post it, and/or respective timestamps of the messages.

A selection component 204 can select a shorter time period than the defined time period. The choice by the selection component 204 of the shorter time period can be a random selection or can be based on various parameters. In an example, the selection of the time period can be a single day within the defined time period, multiple days within the defined time period, and so on. The extraction component 102 can extract all conversations started during the shorter time period chosen by the selection component 204.

If there are multitude of conversations that meet the criteria (e.g., that started during the defined time period), the selection component 204 can choose a subset of the conversations out of the dataset extracted by the extraction component 102. For example, a defined number of conversations can be utilized to choose the subset of the conversations. The defined number can be ten conversations, for example, however, another number can be selected. Further, if there are less than the defined number of conversations in the extracted dataset, the process can be aborted and another defined period of time can be chosen by the selection component 204.

A merge component 206 can mix the conversations messages together. Upon or after the conversation messages are mixed, a sorting component 208 can sort the messages according to respective timestamps. It is noted that the conversation messages can retain their respective metadata, especially the conversation identifications.

For example, a first set of conversations could relate to the weather, a second set of conversations could relate to a movie, a third conversation set could relate to a music event, and a fourth conversation could relate to a current situation. The merge component 206 can mix the messages contained in the first set of conversations, the second set of conversations, the third set of conversations, and the fourth set of conversations. Upon or after the mixing by the merge component 206, a first message received by the model 104 could relate to the music event, a second message received by the model 104 could relate to the weather, a third message received could relate to the movie, a fourth message received could relate to the weather, and so on. As such, the messages input to the model 104 can be related to any of the topics, such that the model 104 has to determine to which context or thread the particular message belongs.

Upon or after a large number of mixed datasets is obtained (e.g., one million), each with the defined number of conversations in parallel, the training-data construction process can complete. Thus, in this example, the final synthetic dataset can include one million subsets of ten conversations, wherein conversations of the ten conversations can include multiple messages. Accordingly, respective mixed datasets can represent a sequence of a multi-thread conversation channel in a short period of time. It is to be understood that the selection of the defined period of time, the extraction of the conversations, the mixing of the conversations, and so on can be repeated. It is noted that a large number of mixed datasets can be utilized to build the model since, the larger the number of datasets utilized to train the model, the higher the confidence level.

In further detail, the model component 106 can facilitate building the model 104. For example, if there is a channel and a single message posted, it is known with certainty that the single message is its own conversation thread. When a second message is posted (from the same entity that posted the first message or a different entity), a determination should be made whether the second message belongs to the same topic as the first message, or if a new thread of conversation has been started with the second message. For example, in multiple-party conversations, there can be multiple discussions occurring (e.g., talking about weather, movies, work, an entertainment event, and so on). Thus, multiple conversation threads can be occurring in parallel (e.g., at substantially the same time).

According to some implementations, seed data (e.g., a data set) can be utilized as initial input to the model to facilitate the training of the model 104 by the model component 106. In an example, if seed data is utilized, the seed data can be obtained from one or more form data, including line form data, to construct a synthetic dataset (e.g., from the seed data). The synthetic dataset can be utilized, at least in part, by the model component 106 to train the model 104.

However, the disclosed implementations are not limited to this implementation and seed data is not necessary to facilitate training of the model 104. Instead, the model 104 can be trained on new data received (e.g., the input data 114).

The data (e.g., seed data and/or new data) can be collected and, optionally, labeled with various metadata. For example, the data can be labeled with a conversation identifier, or other data, such as identification of an entity that posted the data, a time the data was posted, the content posted, and so on.

Figure 3:
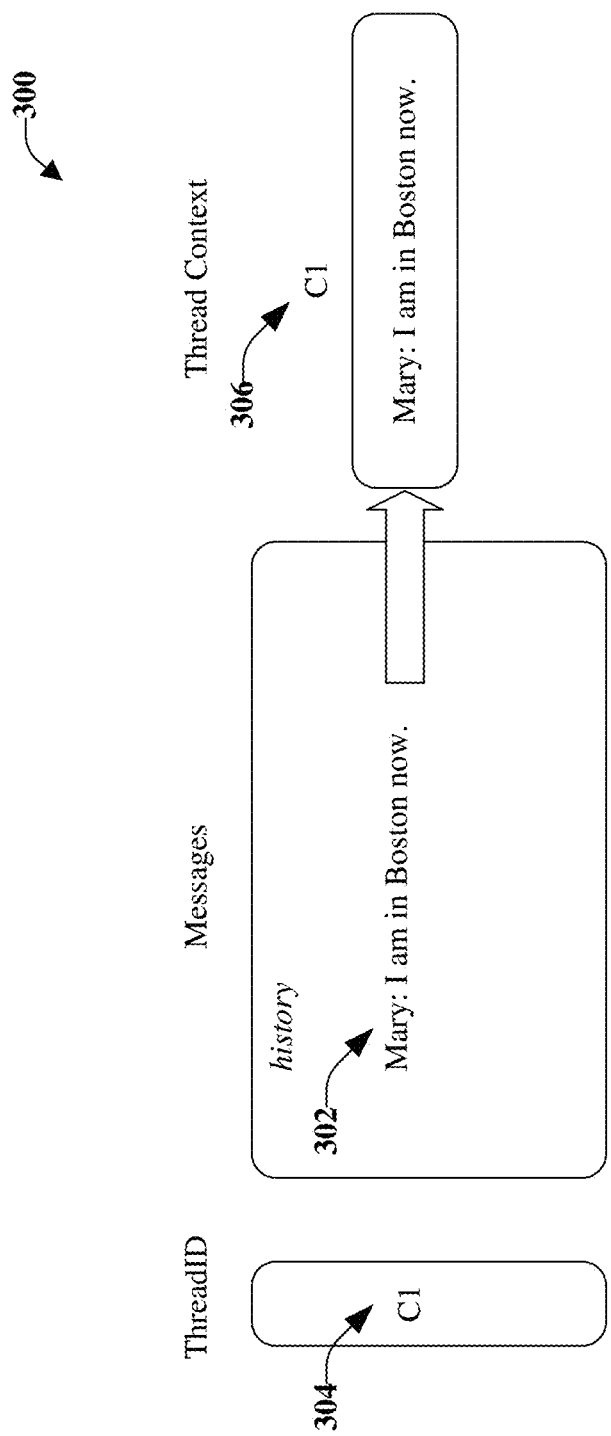
FIG. 3 illustrates an example, non-limiting schematic representation of assignment of a first message to a first thread context for building a thread detection model in accordance with one or more embodiments described herein.

FIG. 3 illustrates an example, non-limiting schematic representation 300 of assignment of a first message to a first thread context for building a thread detection model in accordance with one or more embodiments described herein. Repetitive description of like elements employed in other embodiments described herein is omitted for sake of brevity.

A first message 302 can be received from a first user device (e.g., a first user). For example, as illustrated the first message 302 can be received from Mary and can contain the wording "I am in Boston now." The first message 302 can be assigned to a first thread 304 (e.g., a first tread identifier (ThreadID)), identified as a first context (C1). Accordingly, the first message 302 can be used as a first thread 304 (e.g., thread context), identified as C1, for subsequently received messages.

Figure 4:
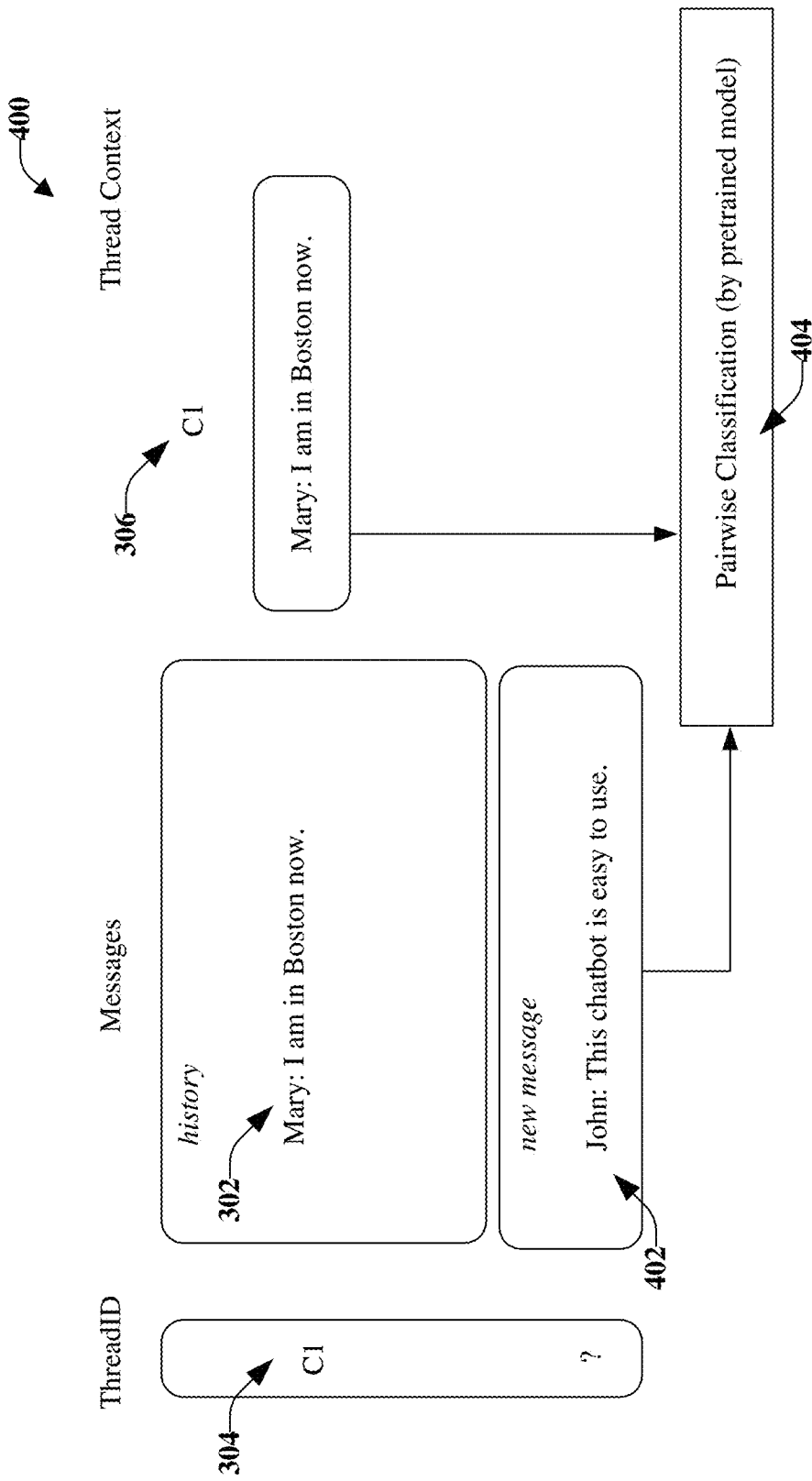
FIG. 4 illustrates an example, non-limiting schematic representation of comparison of a second message with the first message during the building the thread detection model in accordance with one or more embodiments described herein.

FIG. 4 illustrates an example, non-limiting schematic representation 400 of comparison of a second message with the first message during the building the thread detection model in accordance with one or more embodiments described herein. Repetitive description of like elements employed in other embodiments described herein is omitted for sake of brevity.

A illustrated a second message 402 can be received from the first user device or from a second user device (e.g., a second user). The second message 402 can be a response to the first message 302, or can be related to a different topic. In the example of FIG. 4, the second message 402 is received from John and contains the wording "This chatbot is easy to use". Upon or after receipt of the second message 402, a first pairwise classification 404 can be performed between the first message 302 and the second message 402 (e.g., via the model 104 (a pretrained model)).

The first pairwise classification 404 can be utilized to determine a similarity score between the first message 302 and the second message 402. The similarity score can be a binary similarity score, for example. If the similarity score is lower than a threshold value T, it can indicate detection of a new thread, and should be assigned a different thread ID and/or a different thread context than the first message. However, if the similarity score is equal to or higher than the threshold value T, it can indicate that the second message 402 is related to the first message 302 and should be assigned the same thread ID and/or same thread context as the first message. It is noted that although related sentences are discussed with respect to the similarity score being equal to or higher than the threshold value T, the disclosed aspects are not limited to this implementation. Instead, the related sentences could be identified based on the similarity score being higher than, lower than, or equal to or lower than the threshold value T. Further, although the non-related sentences are discussed with respect to similarity score being lower than a threshold value T, the disclosed aspects are not limited to this implementation. Instead, the non-related sentences could be equal to or lower than, higher than, or equal to or higher than the threshold value T.

Figure 5:
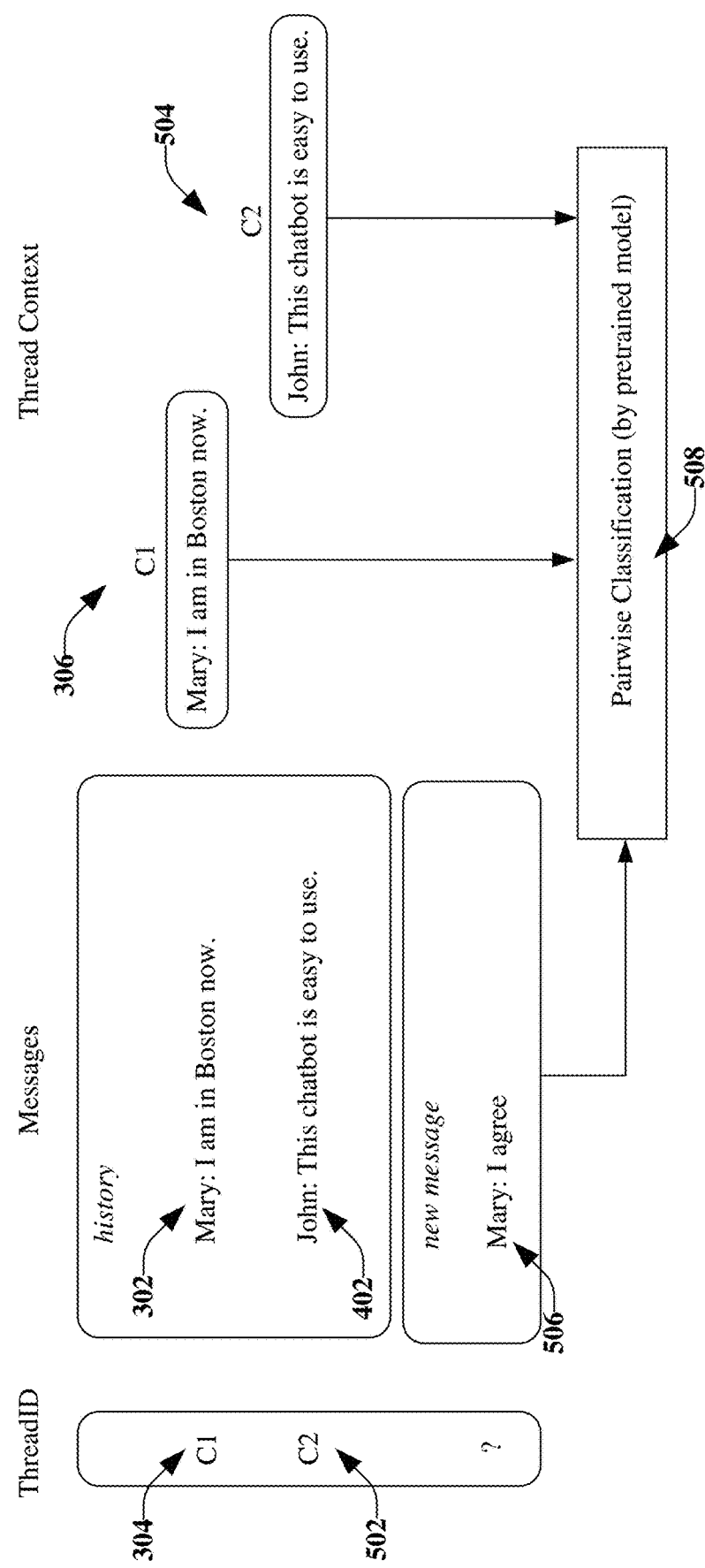
FIG. 5 illustrates an example, non-limiting schematic representation of comparison of a third message with the first message and the second message in accordance with one or more embodiments described herein.

FIG. 5 illustrates an example, non-limiting schematic representation 500 of comparison of a third message with the first message and the second message in accordance with one or more embodiments described herein. Repetitive description of like elements employed in other embodiments described herein is omitted for sake of brevity.

Continuing the above example, the second message 402 is determined to be a new message (e.g., the similarity score satisfied the threshold value T). Accordingly, the second message 402 is determined to not be related to the first message 302. Therefore, the second message 402 can be assigned a second thread ID 502, identified as C2, and to a second thread context 504, identified as C2.

Further, a third message 506 can be received from the first user device, the second user device, or a third user device (e.g., a third user). In the example of FIG. 5, the third message 506 is received from the first user (e.g., Mary). The wording of the third message 506, in this example, is "I agree". Accordingly, a second pairwise classification 508 can be performed (e.g., via the model 104). The second pairwise classification 508 can facilitate a first comparison between the third message 506 and the second message 402, and a second comparison between the third message 506 and the first message 302.

Figure 6:
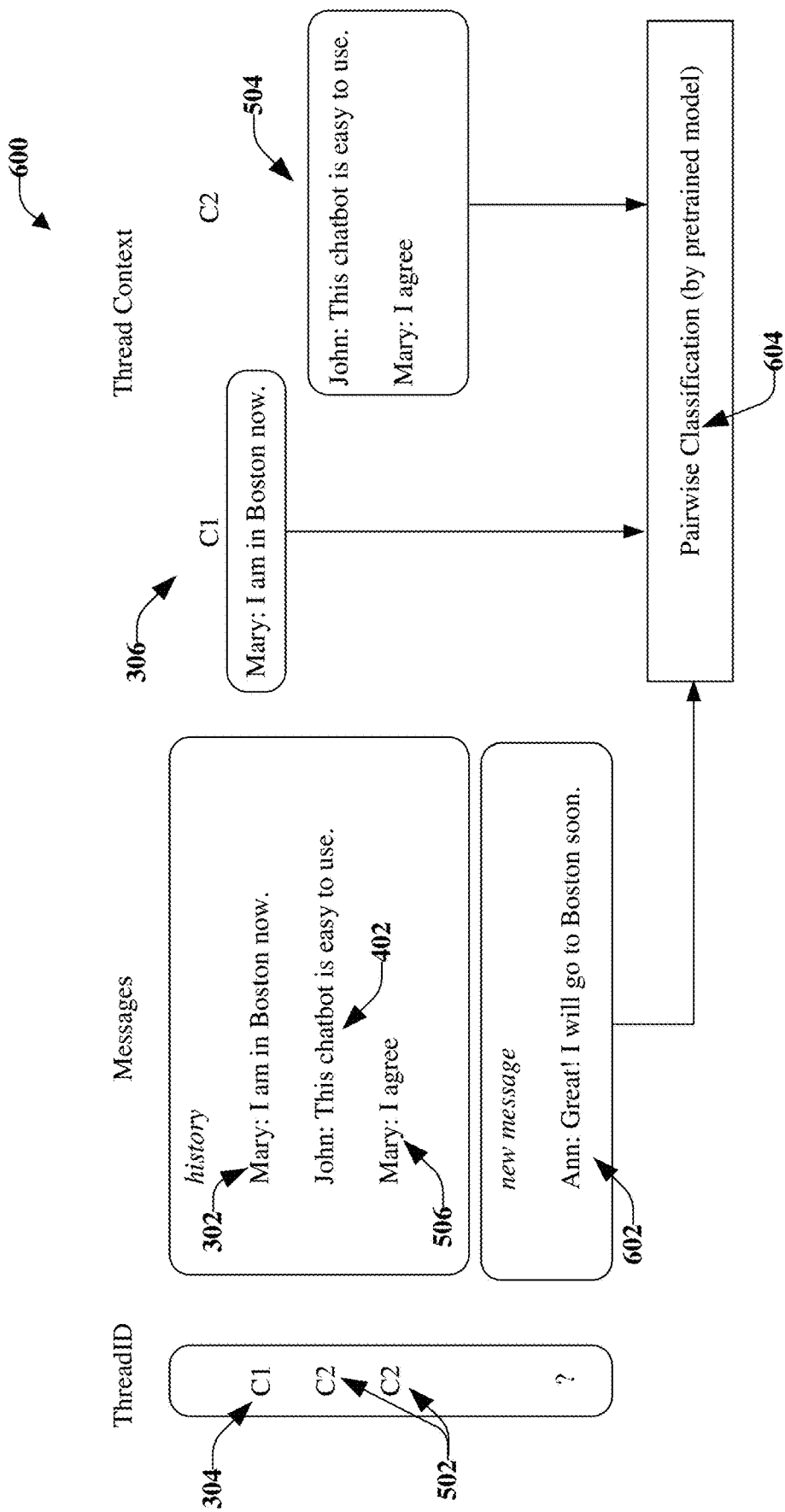
FIG. 6 illustrates an example, non-limiting schematic representation of comparison of a fourth message with the first message, the second message, and the third message in accordance with one or more embodiments described herein.

The first comparison can generate a first similarity score and the second comparison can generate a second similarity score. For the purposes of the example of FIG. 5, the first similarity score is above the threshold value T and the second similarity score is below the threshold value T. Accordingly, the third message 506 is assigned to the second thread context 504 (C2), as shown in FIG. 6, which illustrates an example, non-limiting schematic representation 600 of comparison of a fourth message 602 with the first message 302, the second message 402, and the third message 506 in accordance with one or more embodiments described herein. Repetitive description of like elements employed in other embodiments described herein is omitted for sake of brevity. It is noted that the processes illustrated in FIGS. 3-6 can be implemented for building the thread detection model and/or during usage of the model.

A fourth message 602 can be received from the first entity, the second entity, or a third entity. In this example, the fourth message 602 is received from a third entity (Ann) and contains the wording "Great! I will go to Boston soon." A third pairwise classification 604 can be performed (via the pretrained model). The third pairwise classification 604 can perform three comparisons. A first comparison can be between the fourth message 602 and the first message 302, a second comparison can be between the fourth message 602 and the second message 402, and a third comparison can be between the fourth message 602 and the third message 506.

Based on the third pairwise classification 604, the fourth message 602 can be assigned to the first thread context 306 (C1) or the second thread context 504 (C2) as a function of the confidence level associated with the three comparisons. For example, if the confidence level of the fourth message 602 being related to the first message 302 is satisfied, the fourth message 602 can be assigned to the first thread 304 and/or the first thread context 306. Alternatively, if the confidence level associated with the fourth message 602 being related to the second message 402 and/or the third message 506 is satisfied, the fourth message 602 can be assigned to the second thread id 502 and/or the second thread context 504. However, if the confidence level is not satisfied in either case (e.g., the fourth message 602 is determined not to be related to the first message 302, the second message 402, and/or the third message 506), a new thread can be detected and the fourth message 602 can be assigned to a third thread id and/or a third thread context.

According to some implementations, rather than comparing the fourth message 602 to each of the preceding messages (e.g., the first message 302, the second message 402, the third message 506), the fourth message 602 can be compared to the previous contexts (e.g., the first thread context 306 (C1) and the second thread context 504 (C2)). Thus, according to these implementations, the third pairwise classification 604 can perform a first comparison between the fourth message 602 and the first thread context 306 (C1) and a second comparison between the fourth message 602 and the second thread context 504 (C2). Thus, instead of performing the sentence label similarity, as discussed above, in these implementations, a thread context similarity can be performed.

According to some implementations, a unified score can be determined to represent a comparison between the sentence similarity and the thread context similarity. Thus, in the above examples, the sentence comparison results in three similarity scores (e.g., a first similarity score representing the similarity between the fourth message 602 and the first message 302, a second similarity score representing the similarity between the fourth message 602 and the second message 402, and a third similarity score representing the similarity between the fourth message 602 and the third message 506). In contrast, the context similarity results in two context scores (e.g., a first context score representing a first similarity between the fourth message 602 and the first thread context 306 (C1) and a second context score representing a second similarity between the fourth message 602 and the second thread context 504 (C2). By reducing the number of score calculations, a processing efficiency can be realized.

According to one or more implementations, training and testing model for detection of multiple threads in a multi-party conversation channel using a pre-trained general language model is provided. The training can be regarded as an iterative pairwise classification with the current message, which can be detected with a current thread, and the augmented history context of each previously detected thread. During training, for messages belonging to one of the previous threads, maximize the probability for the current messages belonging to that thread. P(label_i|current_message, context_i), where i is one of the previously-seen threads. After this training step, augment the context of the corresponding thread with the current message.

Alternatively, for messages not belonging to any of the previous threads, minimize the probability P(label_i|current_message, context_i) for all previously-seen threads. This message can be added as the initial context of a new thread (e.g., the second thread context 504 (C2)), such that a new thread has been detected. In an example, the pairwise classification can be implemented using one or more pre-trained models in order to more accurately capture more linguistic information from out-of-domain corpus.

To evaluate the model, a multi-thread message channel "in real life" can be chosen and the threads for all messages can be labeled. One or more inference steps using the trained model can be conducted. For N messages that belong to the same conversation channel, the pairwise relationship between each pair of the messages can be computed. The message can be labeled a first value it the messages belong to the same thread. If the messages belong to different threads, the messages can be labeled with a second value, different from the first value. The resulting values can be compared against verified information known about the messages to determine if the assignment of the first value and/or the second value were accurately assigned to the messages.

Figure 7:
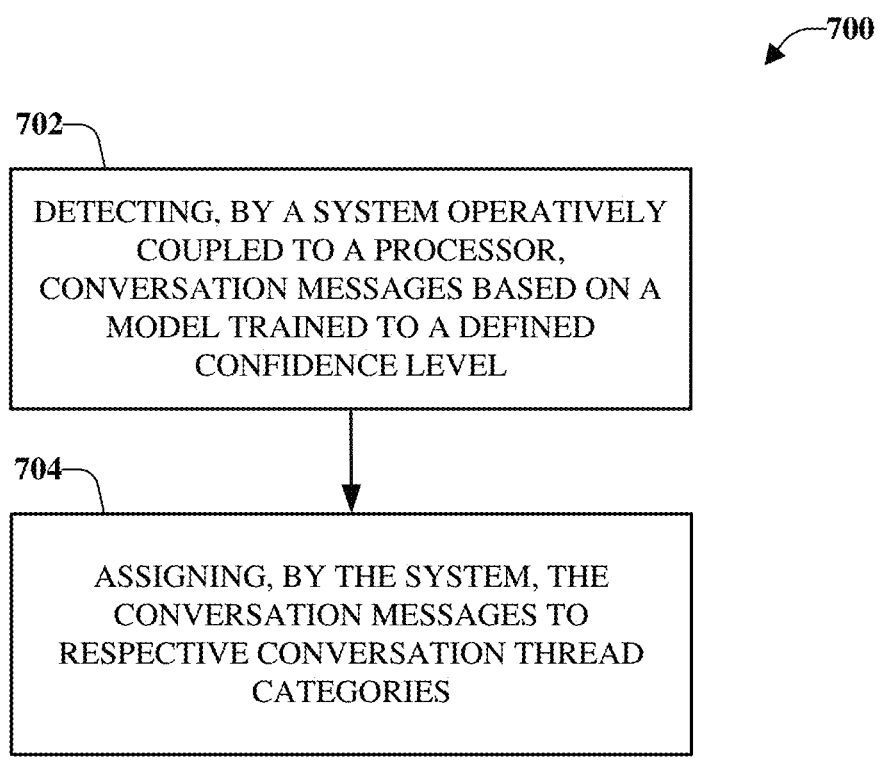
FIG. 7 illustrates a flow diagram of an example, non-limiting, computer-implemented method that facilitates training a model to detect text data of conversation messages in accordance with one or more embodiments described herein.

FIG. 7 illustrates a flow diagram of an example, non-limiting, computer-implemented method 700 that facilitates training a model to detect text data of conversation messages in accordance with one or more embodiments described herein. Repetitive description of like elements employed in other embodiments described herein is omitted for sake of brevity.

At 702 of the computer-implemented method 700, a system operatively coupled to a processor can detect conversation messages based on a model trained to a defined confidence level (e.g., via the extraction component 102). In an example, the conversation messages can be received via a public message channel that comprises multiple conversation threads.

Further, at 704 of the computer-implemented method 700, the system can assign the conversation messages to respective conversation thread categories (e.g., via the model 104). For example, to assign the conversation messages to the appropriate conversation thread categories, the system can disentangle the conversation messages based on the model. For example, the disentanglement can sort mixed conversation messages according to their related context and/or thread.

Figure 8:
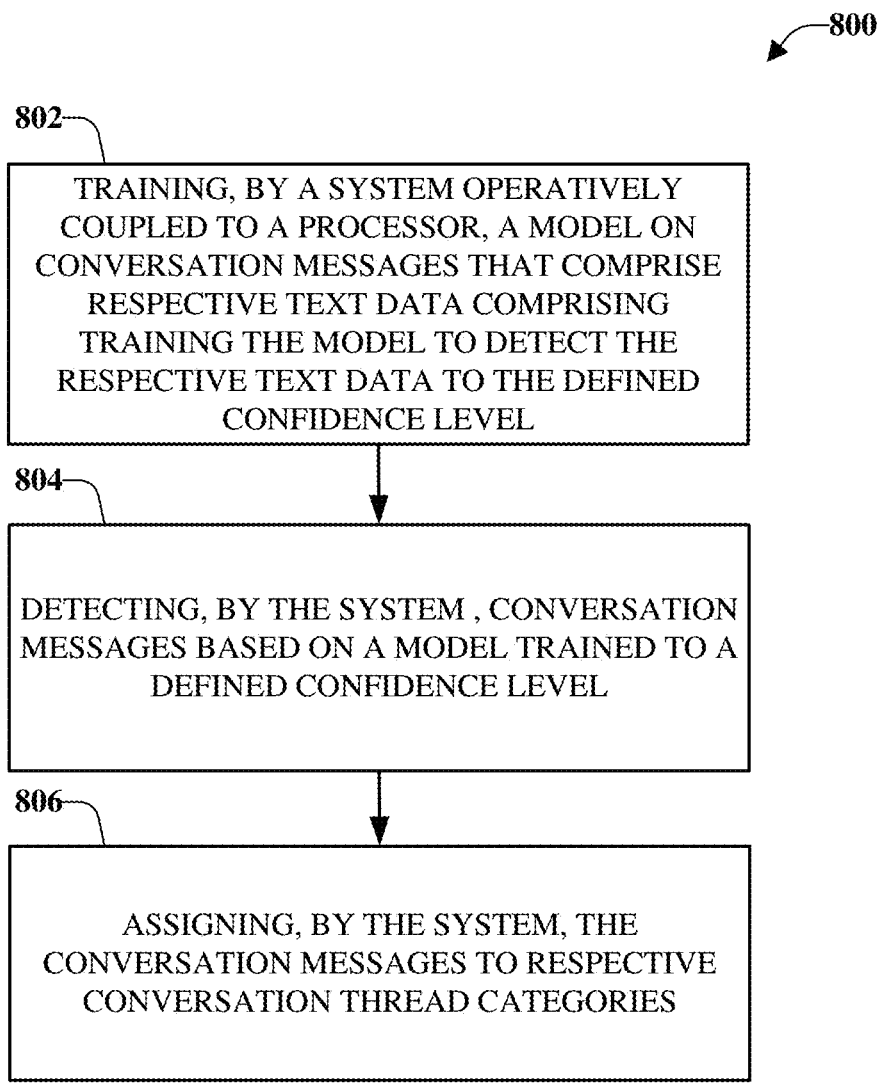
FIG. 8 illustrates a flow diagram of an example, non-limiting, computer-implemented method that facilitates training a model to detect text data of conversation messages in accordance with one or more embodiments described herein.

FIG. 8 illustrates a flow diagram of an example, non-limiting, computer-implemented method 800 that facilitates training a model to detect text data of conversation messages in accordance with one or more embodiments described herein. Repetitive description of like elements employed in other embodiments described herein is omitted for sake of brevity.

At 802 of the computer-implemented method 800, a system operatively coupled to a processor can train a model on conversation messages that comprise respective text data (e.g., via the model component 106). For example, training the model can comprise training the model to detect the respective text data to the defined confidence level. In an example, training the model can comprise training the model to identify respective text data of the conversation messages received over a defined interval. In another example, training the model can comprise training the model on respective text data of conversation messages that commenced during a defined interval. For example, conversation messages that commenced prior to the defined interval for training the model can be ignored. The conversation messages can comprise parallel conversations that occur during an overlapping time period.

At 804 of the computer-implemented method 800, the system can detect conversation messages based on a model trained to a defined confidence level (e.g., via the extraction component 102). Further, at 806 of the computer-implemented method 800, the system can assign the conversation messages to respective conversation thread categories (e.g., via the model 104).

Figure 9:
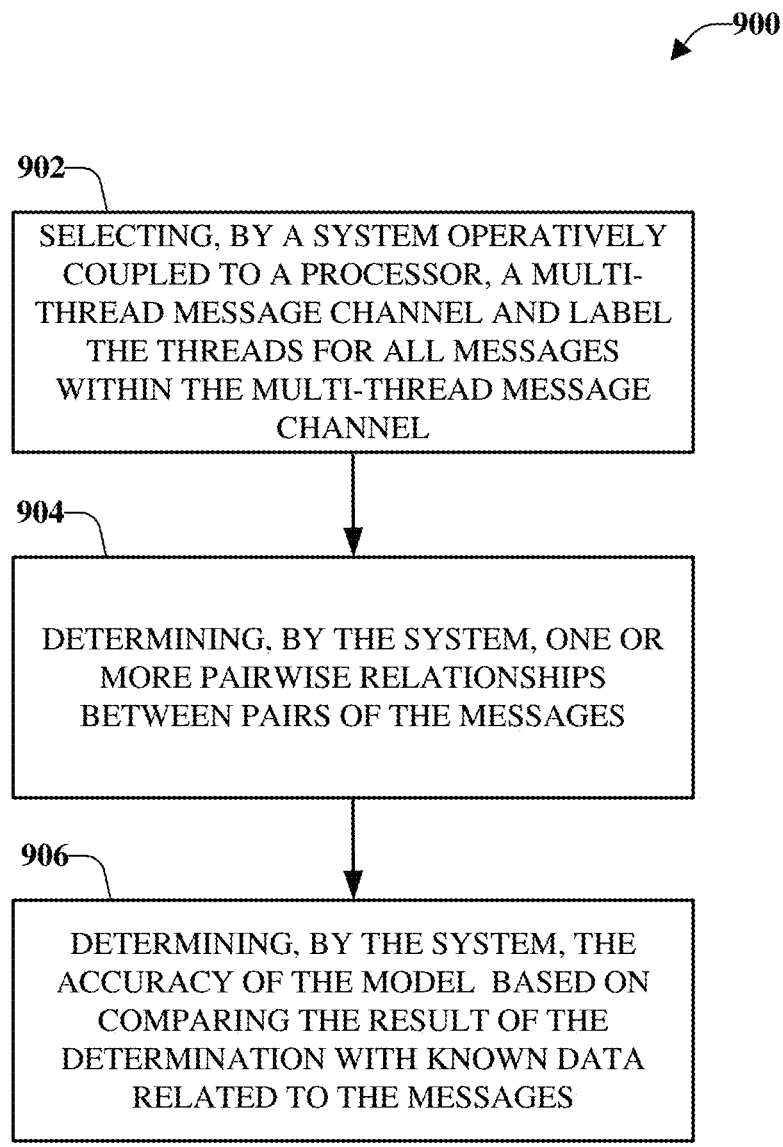
FIG. 9 illustrates a flow diagram of an example, non-limiting, computer-implemented method that facilitates thread detection model evaluation in accordance with one or more embodiments described herein.

FIG. 9 illustrates a flow diagram of an example, non-limiting, computer-implemented method 900 that facilitates thread detection model evaluation in accordance with one or more embodiments described herein. Repetitive description of like elements employed in other embodiments described herein is omitted for sake of brevity.

The computer-implemented method 900 begins, at 902, when a system comprising a processor can select a multi-thread message channel and label the threads for all messages within the multi-thread message channel (e.g., via the selection component 204). Further, at 904 of the computer-implemented method 900, one or more pairwise relationships can be determined between pairs of the messages (e.g., via the model 104). For example, there can be N! pairs in total. According to some implementations, the one or more pairwise relationships can be determined for all pairs of the messages, or a subset thereof. An output of the pairwise relationships can be a first value or a second value. For example, if the output is a first value, it can indicate that the pair belong to the same thread. If the output is a second value, it can indicate that the pair do not belong to the same thread.

At 906 of the computer-implemented method 900, the accuracy of the model can be determined based on comparing the result of the determination, at 904, with known data related to the messages (e.g., via the processing component 108). For example, the similarity between the messages can be known prior to inputting the messages into the model. Accordingly, the output of the model can be compared to the known similarity to determine the accuracy of the model.

Figure 10:
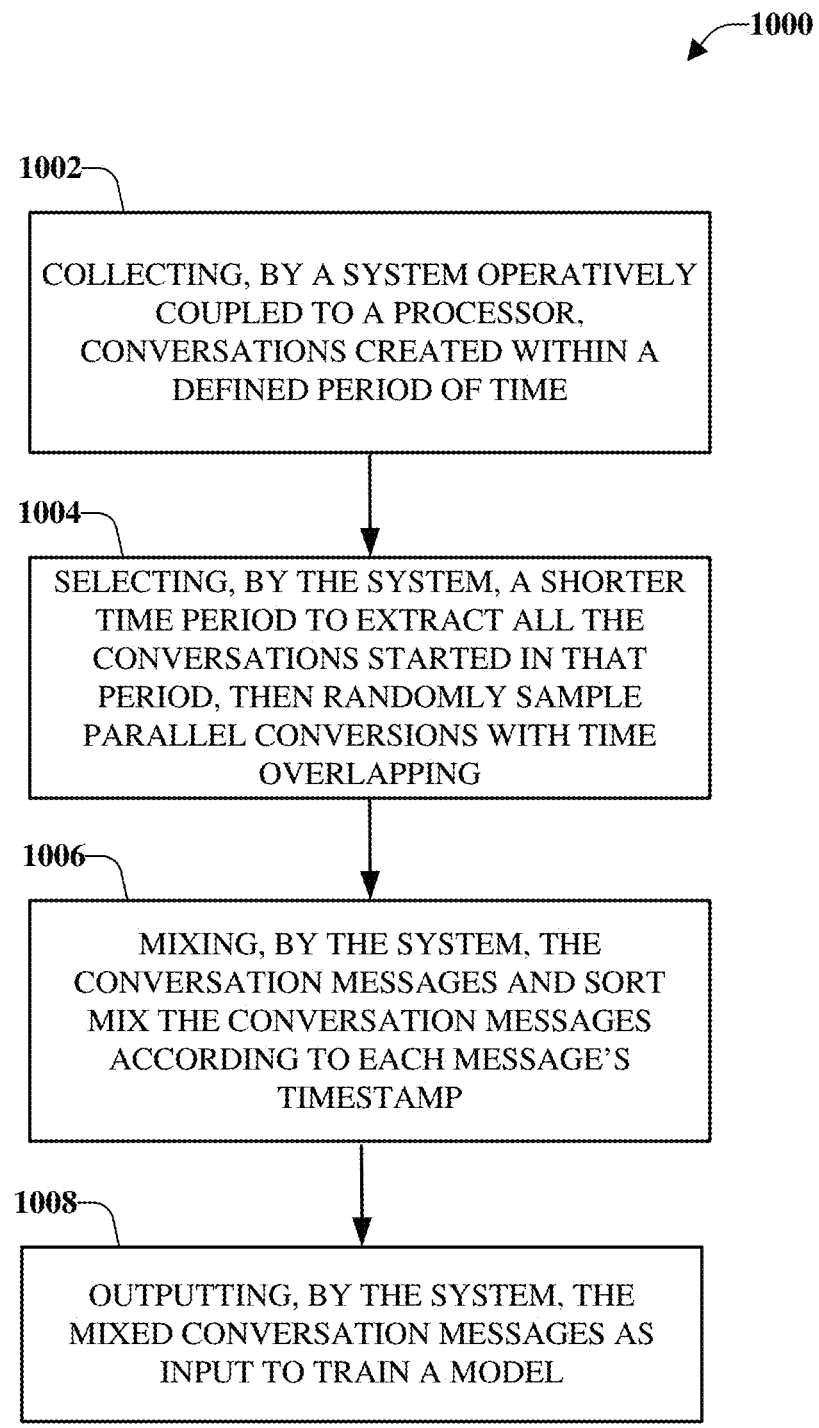
FIG. 10 illustrates a flow diagram of an example, non-limiting, computer-implemented method that facilitates creating a large-scale, synthetic, labeled, dataset for multiple party conversation threads in accordance with one or more embodiments described herein.

FIG. 10 illustrates a flow diagram of an example, non-limiting, computer-implemented method 1000 that facilitates creating a large-scale, synthetic, labeled, dataset for multiple party conversation threads in accordance with one or more embodiments described herein. Repetitive description of like elements employed in other embodiments described herein is omitted for sake of brevity.

The computer-implemented method 1000 begins, at 1002, when a system comprising a processor can collect conversations created within a defined period of time (e.g. via the model component 106). Each conversation can include messages with content text, as well as some meta-data including a unique conversation ID, the user ID who post it, and timestamp of each message.

Further, at 1004 of the computer-implemented method 1000, the system can select a shorter time period to extract all the conversations started in that period, then randomly sample parallel conversions with time overlapping (e.g. via the selection component 204). The shorter time period can be, for example, a single day of a thirty days period. Further, the shorter time period can be selected randomly. In some implementations, the parallel conversations can comprise ten parallel conversations.

The system, at 1006 of the computer-implemented method 1000, can mix the conversation messages and sort mix the conversation messages according to each message's timestamp (e.g., via the merge component 206). It is noted that the meta-data of the conversation messages is maintained, including the conversation ID.

As utilized herein, mixing refers to the combination of messages related to different threads combined together. For example, if there is a first post asking about what the weather is like in Massachusetts, there can be multiple user replies (e.g., "Do you mean today", "Tomorrow it will be rainy," "In the winter it is cold," "The current temperature is 75 degrees," "What city?", and so on). Accordingly, there is a first thread with multiple messages. Further, there could be a second post asking what is a good movie to see this month and there will be a second thread with multiple replies to the second post.

Further, upon or after a satisfied large number of mixed datasets (e.g., one million), each with ten conversations in parallel, is reached, the training-data construction process can be ended and the mixed conversation messages can be output, at 1008, to train the model (e.g., via the model component 106). The final synthetic dataset can include, for example, one million subsets of ten conversations, and each conversation consists with multiple messages. It is noted that the example of ten conversations is referenced because, based on analysis, it has been observed that for a large percentage of the time, there are only around ten conversations in parallel. However, this number is used as an example only and other values can be utilized with the disclosed aspects.

In an example according to the various aspects provided herein, there can be twenty messages related to automobiles and ten messages related to restaurants, for a total of thirty messages. The model can compare text similarities between the messages. If a first message is about automobiles and the second message is about automobiles, the first and second message will have a higher similarity score. However, if the first message is about automobiles and the second message is about restaurants (or something else), in this case the first message and the second message will have a lower similarity score. Thus, the model (e.g., the model 104) can output a binary classification, such as "0" is not aligned and "1" if the sentences contain similar data.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 11:
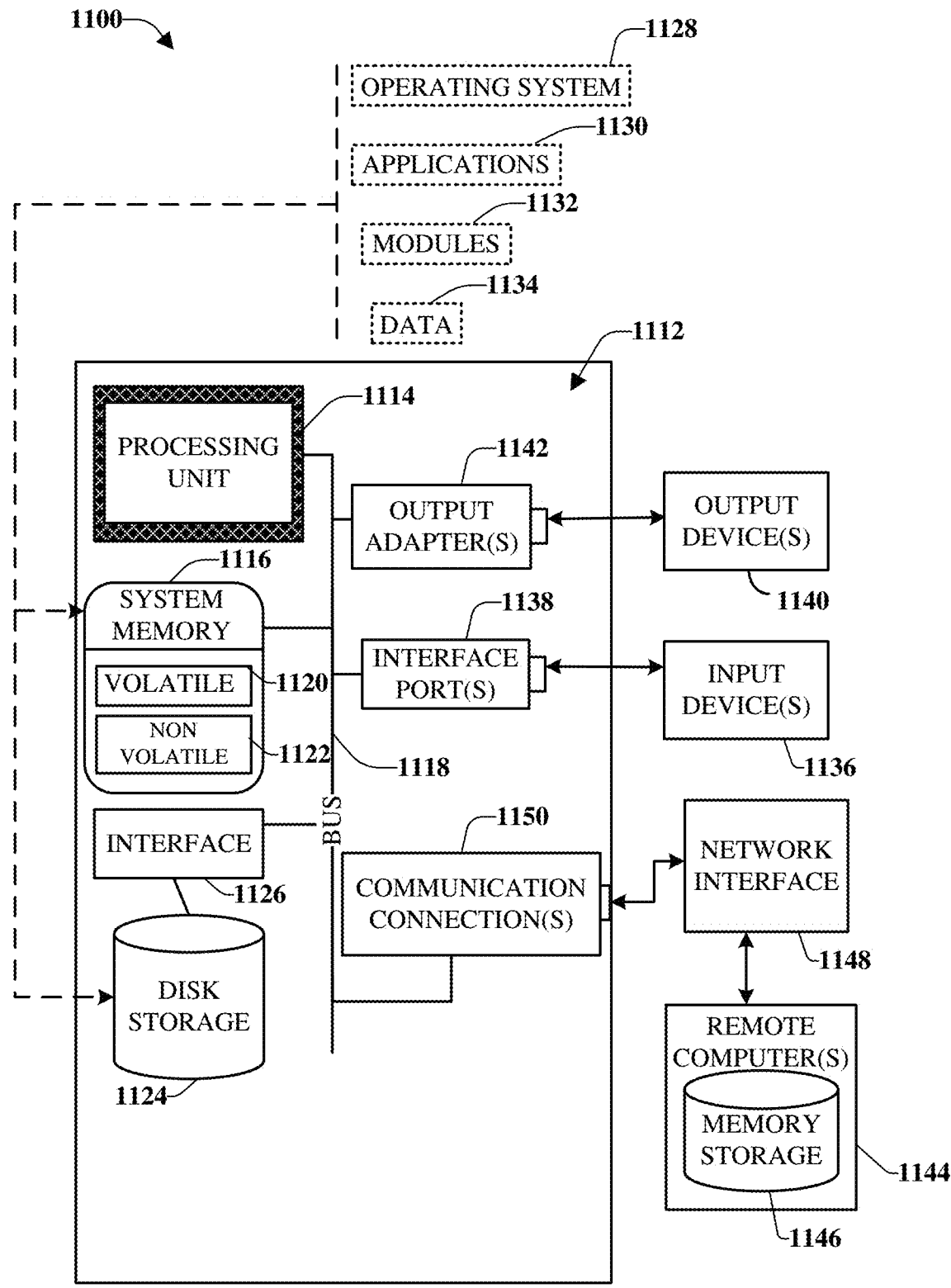
FIG. 11 illustrates a block diagram of an example, non-limiting operating environment in which one or more embodiments described herein can be facilitated.

In order to provide a context for the various aspects of the disclosed subject matter, FIG. 11 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity. With reference to FIG. 11, a suitable operating environment 1100 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), Video Electronics Standards Association (VESA)Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include Read Only Memory (ROM), Programmable ROM (PROM), Electrically Programmable ROM (EPROM), Electrically Erasable Programmable ROM (EEPROM), flash memory, or nonvolatile Random Access Memory (RAM) (e.g., Ferroelectric RAM (FeRAM)). Volatile memory 1120 can also include RAM, which acts as external cache memory. By way of illustration and not limitation, RAM is available in many forms such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), Direct Rambus RAM (DRRAM), direct Rambus dynamic RAM (DRDRAM), and Rambus dynamic RAM.

Computer 1112 can also include removable/non-removable, volatile/nonvolatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1100. Such software can also include, for example, an operating system 1128. Operating system 1128, which can be stored on disk storage 1124, acts to control and allocate resources of the computer 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a method of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics are as follows: on-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a high level of abstraction (e.g., country, state, or data center). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of selected networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
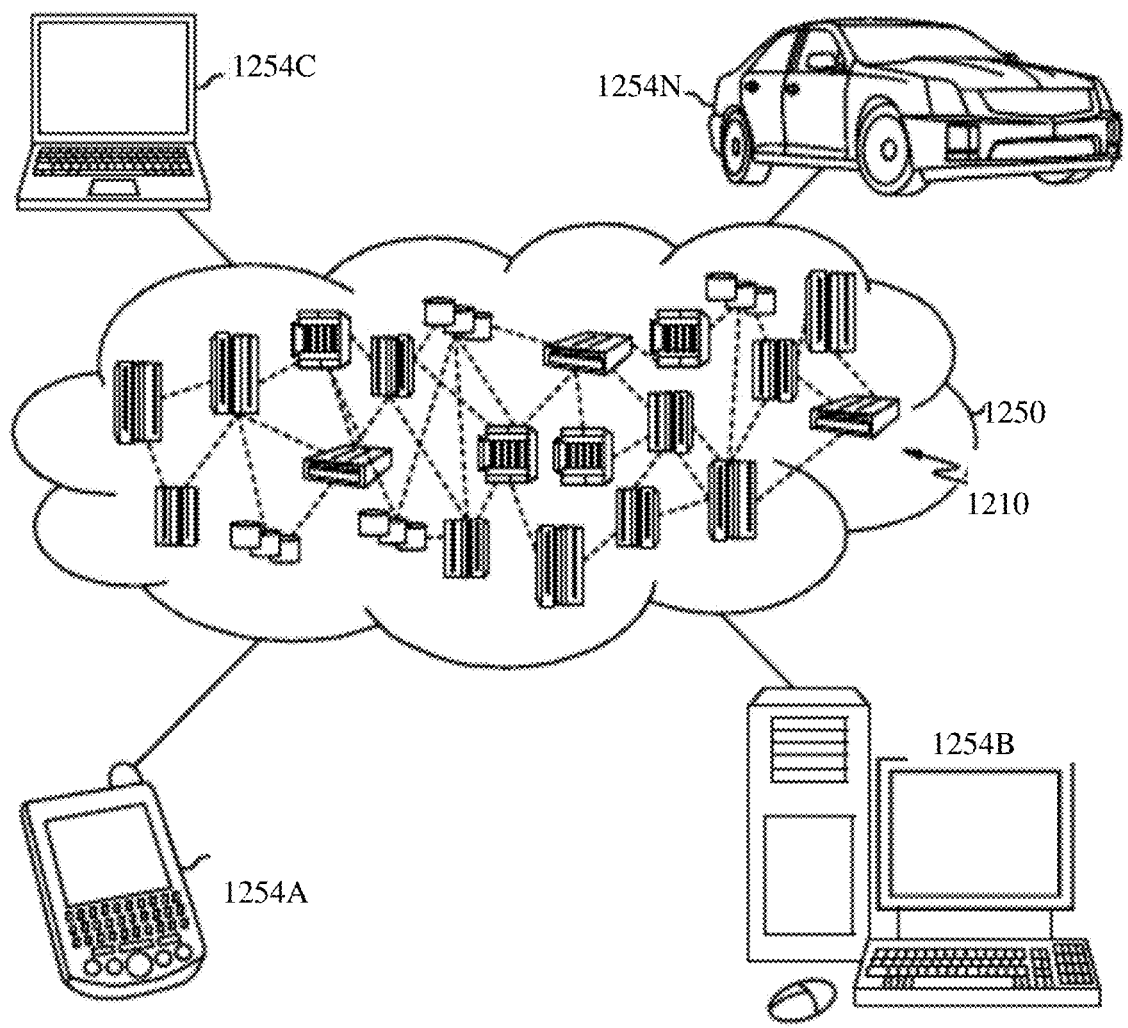
FIG. 12 depicts a cloud computing environment in accordance with one or more embodiments described herein.

Referring now to FIG. 12, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Figure 13:
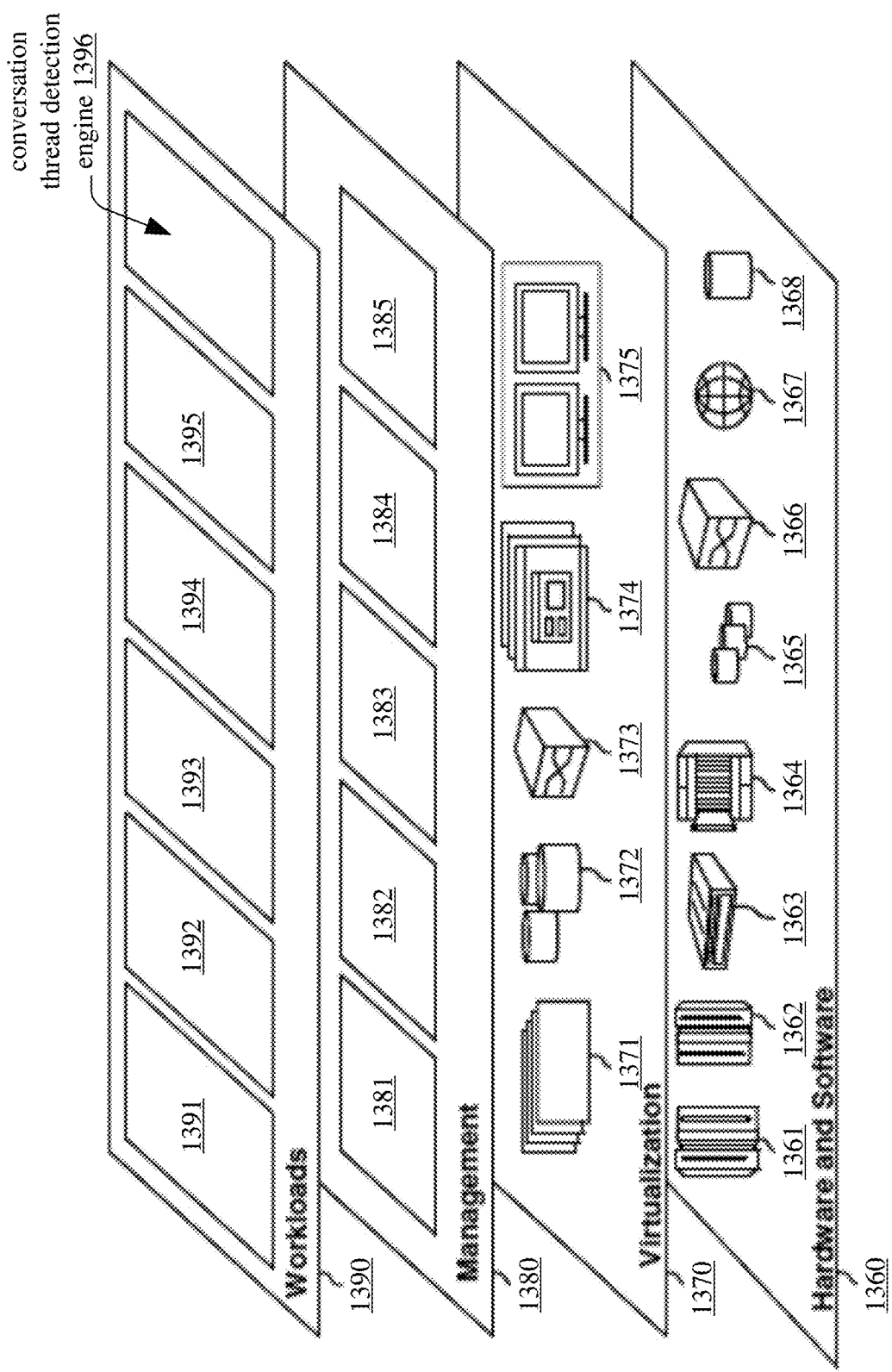
FIG. 13 depicts abstraction model layers in accordance with one or more embodiments described herein.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided: Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, the procurement of, cloud computing resources for which a future requirement is anticipated in accordance with an SLA.

Workloads layer 1390 provides examples of functionality for which the cloud computing environment may be utilized. Examples of workloads and functions which may be provided from this layer include: mapping and navigation 1391; software development and lifecycle management 1392; virtual classroom education delivery 1393; data analytics processing 1394; transaction processing 1395; and conversation thread detection engine 1396.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include ROM, PROM, EPROM, EEPROM, flash memory, or nonvolatile RAM (e.g., FeRAM. Volatile memory can include RAM, which can act as external cache memory, for example. Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
a model component that trains, using machine learning, a model on a first set of unstructured conversation messages that comprise respective text data, wherein the model is trained to detect the respective text data to a defined confidence level; and
an extraction component that employs the model to transform a second set of unstructured conversation messages from a plurality of parties communicating in a communication channel into structured conversation threads having respective contexts, wherein the model:
for a first subset of first unstructured conversation messages of the second set of unstructured conversation messages performs a pairwise sentence comparison of the first unstructured conversation messages to assign the first unstructured conversation messages to the structured conversation threads, and
for a second subset of second unstructured conversation messages of the second set of unstructured conversation messages:
performs a context similarity comparison of the second unstructured conversation messages to the respective contexts of the structured conversation threads, and
based on the context similarity comparison, for respective second unstructured conversation messages, at least one of assign the the second unstructured conversation message to one of the structured conversation threads or assign the second unstructured conversation message to a new structured conversation thread, wherein the context similarity comparison does not comprise the pairwise sentence comparison involving the second unstructured conversation messages, and the first subset is different than the second subset.

2. The system of claim 1, wherein the context similarity comparison generates respective context scores between the second unstructured conversation messages and the respective contexts.

3. The system of claim 1, wherein the model component trains the model to identify the respective text data of the first set of unstructured conversation messages received over a defined interval.

4. The system of claim 1, wherein the model component trains the model on the respective text data of the first set of unstructured conversation messages that commenced during a defined interval.

5. The system of claim 4, wherein the model component ignores prior unstructured conversation messages that commenced prior to the defined interval for training the model.

6. The system of claim 1, wherein the second set of unstructured conversation messages comprise parallel conversations that occur during an overlapping time period.

7. The system of claim 1, wherein the pairwise sentence comparison generates a sentence similarity score.

8. The system of claim 1, wherein the performing the context similarity comparison comprises:
performing the context similarity comparison of the second unstructured conversation messages to the respective contexts of the structured conversation threads, comprising:
in response to the second unstructured conversation message matching, according to a similarity criterion, a context of the respective contexts, assigning the second unstructured conversation message to a first structured conversation thread associated with the context, and
in response to the second unstructured conversation message not matching, according to the similarity criterion, the respective contexts, assigning the second unstructured conversation message to the new structured conversation thread associated with a new context.

9. A computer-implemented method, comprising:
training, by a system operatively coupled to a processor, using machine learning, a model on a first set of unstructured conversation messages that comprise respective text data, wherein the model is trained to detect the respective text data to a defined confidence level;
employing, by the system, the model on a first subset of first unstructured conversation messages of a second set of unstructured conversation messages from a plurality of parties communicating in a communication channel to perform a pairwise sentence comparison of the first unstructured conversation messages to assign the first unstructured conversation messages to structured conversation threads; and
employing, by the system, the model on a second subset of second unstructured conversation messages of the second set of unstructured conversation messages to:
perform a context similarity comparison of the second unstructured conversation messages to respective contexts of the structured conversation threads, and
based on the context similarity comparison, for respective second unstructured conversation messages, at least one of assign the second unstructured conversation message to one of the structured conversation threads or assign the second unstructured conversation message to a new structured conversation thread, wherein the context similarity comparison does not comprise the pairwise sentence comparison involving the second unstructured conversation messages, and the first subset is different than the second subset.

10. The computer-implemented method of claim 9, wherein the context similarity comparison generates respective context scores between the second unstructured conversation messages and the respective contexts.

11. The computer-implemented method of claim 9, wherein the training the model further comprises training, by the system using the machine learning, the model to identify the respective text data of the first set of unstructured conversation messages received over a defined interval.

12. The computer-implemented method of claim 9, wherein the training the model further comprises training, by the system, the model on the respective text data of the first set of unstructured conversation messages that commenced during a defined interval.

13. The computer-implemented method of claim 12, further comprising:
    ignoring, by the system, prior unstructured conversation messages that commenced prior to the defined interval for training the model.

14. The computer-implemented method of claim 9, wherein the second set of unstructured conversation messages comprise parallel conversations that occur during an overlapping time period.

15. The computer-implemented method of claim 9, wherein the pairwise sentence comparison generates a sentence similarity score.

16. The computer-implemented method of claim 9, wherein the performing the context similarity comparison comprises:
    performing, by the system using the model, the context similarity comparison of the second unstructured conversation messages to the respective contexts of the structured conversation threads, comprising:
        in response to the second unstructured conversation message matching, according to a similarity criterion, a context of the respective contexts, assigning the second unstructured conversation message to a first structured conversation thread associated with the context, and
        in response to the second unstructured conversation message not matching, according to the similarity criterion, the respective contexts, assigning the second unstructured conversation message to the new structured conversation thread associated with a new context.

17. A computer program product that facilitates detection of conversation threads in a messaging channel, the computer program product comprising a computer readable storage medium having program instructions embodied therewith, the program instructions are executable by a processor to cause the processor to:
    training, using machine learning, a model on a first set of unstructured conversation messages that comprise respective text data, wherein the model is trained to detect the respective text data to a defined confidence level;
    employ the model on a first subset of first unstructured conversation messages of a second set of unstructured conversation messages from a plurality of parties communicating in a communication channel to perform a pairwise sentence comparison of the first unstructured conversation messages to assign the first unstructured conversation messages to structured conversation threads; and
    employ the model on a second subset of second unstructured conversation messages of the second set of unstructured conversation messages to:
        perform a context similarity comparison of the second unstructured conversation messages to respective contexts of the structured conversation threads, and
        based on the context similarity comparison, for respective second unstructured conversation messages, at least one of assign the second unstructured conversation message to one of the structured conversation threads or assign the second unstructured conversation message to a new structured conversation thread, wherein the context similarity comparison does not comprise the pairwise sentence comparison involving the second unstructured conversation messages, and the first subset is different than the second subset.

18. The computer program product of claim 17, wherein the context similarity comparison generates respective context scores between the second unstructured conversation messages and the respective contexts.

19. The computer program product of claim 17, wherein the pairwise sentence comparison generates a sentence similarity score.

20. The computer program product of claim 17, wherein the performance of the context similarity comparison comprises:
    perform the context similarity comparison of the second unstructured conversation messages to the respective contexts of the structured conversation threads, comprising:
        in response to the second unstructured conversation message matching, according to a similarity criterion, a context of the respective contexts, assign the second unstructured conversation message to a first structured conversation thread associated with the context, and
        in response to the second unstructured conversation message not matching, according to the similarity criterion, the respective contexts, assign the second unstructured conversation message to the new structured conversation thread associated with a new context.

* * * * *